(12) United States Patent
Tucker

(10) Patent No.: US 8,656,421 B2
(45) Date of Patent: Feb. 18, 2014

(54) SYSTEM AND METHOD FOR CONTROLLING A NETWORK

(75) Inventor: Curtis Tucker, Lee's Summit, MO (US)

(73) Assignee: CenturyLink Intellectual Property LLC, Denver, CO (US)

(*) Notice: Subject to any disclaimer, the term of this patent is extended or adjusted under 35 U.S.C. 154(b) by 390 days.

(21) Appl. No.: 11/507,192

(22) Filed: Aug. 21, 2006

(65) Prior Publication Data

US 2008/0046584 A1    Feb. 21, 2008

(51) Int. Cl.
*H04H 60/33*    (2008.01)

(52) U.S. Cl.
USPC ....... 725/10; 725/9; 725/93; 725/95; 725/116

(58) Field of Classification Search
None
See application file for complete search history.

(56) References Cited

U.S. PATENT DOCUMENTS

| | | | | |
|---|---|---|---|---|
| 4,979,047 A * | 12/1990 | Wine | ............................ | 386/205 |
| 5,894,331 A * | 4/1999 | Yang | ............................. | 348/730 |
| 6,738,361 B1 * | 5/2004 | Immonen et al. | ............. | 370/328 |
| 7,406,315 B2 * | 7/2008 | Uhlik et al. | ................ | 455/452.1 |
| 2002/0120769 A1 * | 8/2002 | Ammitzboell | ................ | 709/238 |
| 2006/0059505 A1 * | 3/2006 | Miyazaki | ......................... | 725/14 |
| 2006/0064729 A1 * | 3/2006 | Steading | ......................... | 725/95 |
| 2007/0061830 A1 * | 3/2007 | Chang | ................................ | 725/9 |

\* cited by examiner

*Primary Examiner* — Chenea Smith
(74) *Attorney, Agent, or Firm* — Swanson & Bratschun, L.L.C.

(57) ABSTRACT

A system and method for controlling network bandwidth that uses a timer to monitor the length of time that a set top box is set to a channel and, in response to the timer reaching a time limit, requesting a response from a user to verify that the channel is still being watched. If a response is not received with a specified time duration, the signal for the IPTV channel may be disconnected. The system may be configured to include "thin client" middleware on a network server or "thick client" middleware on a set top box, for example, to operate in conjunction with a network server.

28 Claims, 6 Drawing Sheets

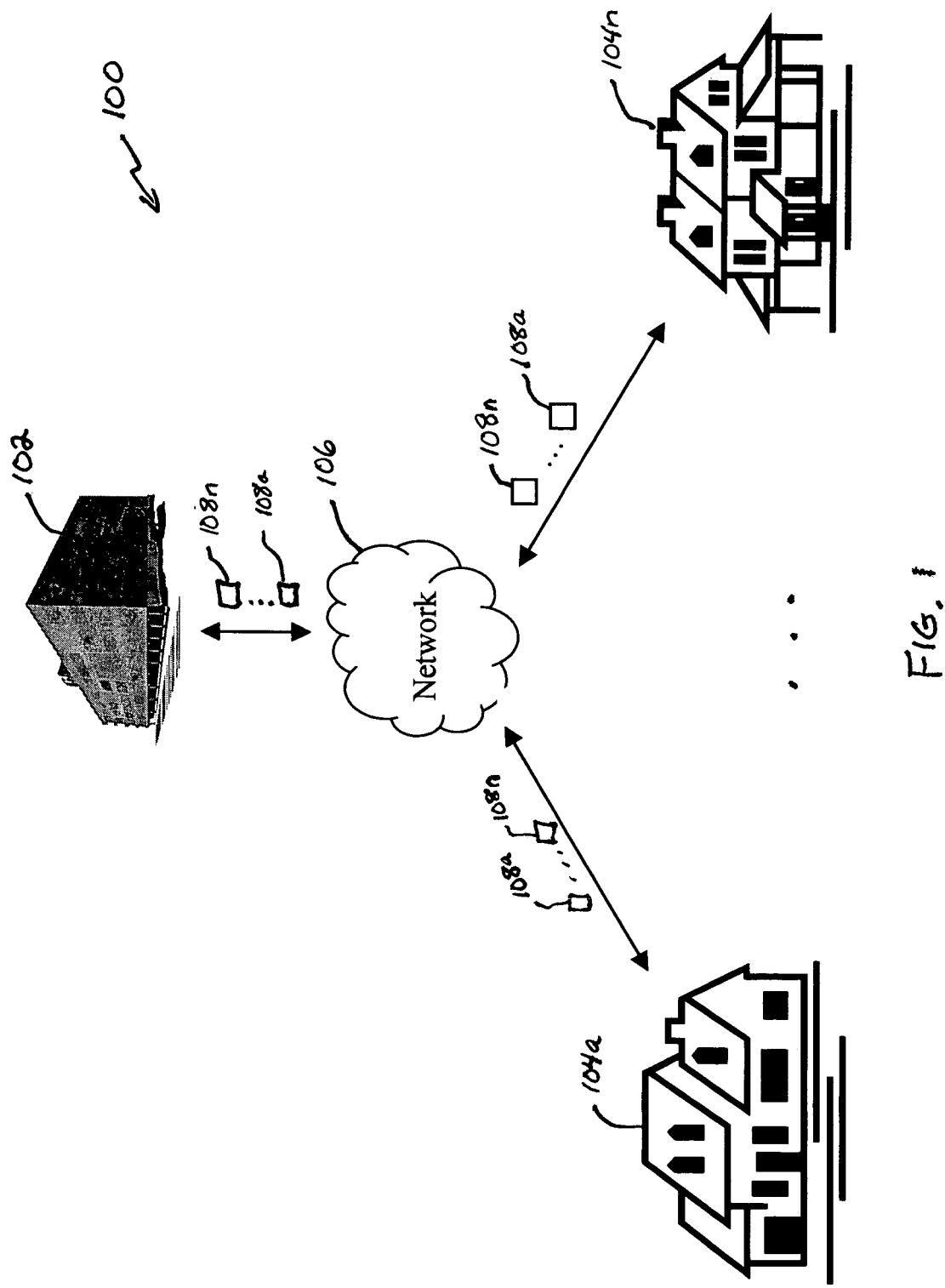

SYSTEM AND METHOD FOR CONTROLLING A NETWORK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE PRESENT INVENTION

Internet protocol Television (IPTV) describes a system where a digital television service is delivered using Internet protocol (IP) over a network. The network used for IPTV may include the public Internet or a private IP network controlled by an IPTV service provider via a broadband connection known as digital subscriber lines (DSL), where a digital subscriber line typically includes conventional telephone lines with copper wire into households. Alternatively, the digital subscriber may be fiber to the premises (FTTP). Telecommunication service provider companies that have begun offering DSL have limited bandwidth resources when delivering video over existing copper wire infrastructures.

Cable companies have developed and begun deploying voice over IP (VoIP) services within telephone company markets. By doing so, their offerings have grown from high-speed data and video services to include voice communication services (i.e., telephone services). By offering bundled services, cable companies can now offer customers the ability to have a common service provider for all three services (i.e., data, video, and telephone) and receive only one bill from the cable provider. In order for the telephone service providers to compete, they must provide customers with an alternative bundling of services, including video services. Today, most telephone access networks provide broadband Internet access by using DSL technology. Because the technology involves connecting copper wire from the central office to the customers, bandwidth is limited based on the distance, interference, and physical bandwidth limitations of copper wire. In order for telephone service providers to offer video over their existing copper wire infrastructures, they must deliver entertainment services, such as IPTV over using existing DSL technology to provide video services. However, even with the use of IPTV technology, bandwidth limitations over copper wire infrastructure still impacts the overall service capability of the telecommunications service provider.

FIG. 1 is an illustration of an exemplary communication system 100 between a service provider 102 and subscribers 104a-104n (collectively 104). Communication from the service provider 102 may be performed over a network 106, such as the Internet or public/private switched telephone network (PSTN), for example. It should be understood that the network 106 may be any network or telecommunications transport network that is capable of communicating data packets. Communication of content, such as video content, is performed using data packets 108a-108n (collectively 108) from the service provider 102 to the subscribers 104. In the case of delivering IPTV, channels are setup by the service provider 102 to allow subscribers to access a particular channel delivering particular content. For example, an IPTV channel may deliver sports content (e.g., ESPN), movie content (e.g. HBO), or other video content. As telecommunication service providers continue to deliver IPTV services, IPTV channels will expand in a similar manner as cable and satellite systems.

In receiving IPTV, each subscriber uses a set top box in conjunction with a television. The set top box operates to receive the data packets 108 being communicated from the service provider 102 and organizes the data packets to display video content on a television. The IPTV set top boxes are configured in a similar manner as those from the early days of conventional cable television that were separate devices from the televisions. As occurred with set top boxes in cable systems, a person watching IPTV may turn off the television when finished watching a television channel or movie, but may leave the set top box turned on. While this was not a significant problem in the cable industry due to having significantly higher bandwidth, it is a problem with DSL delivery systems over copper wire infrastructure for the reasons described above. Specifically, the problem of leaving the IPTV set top box turned on causes the IPTV channel to remain turned on until the user physically turns off the set top box. This continued communication of the IPTV channel causes the video bandwidth to remain active over the DSL access line and could also impact the telecommunications transport network. Because all facets of communication systems, especially those associated with copper lines, have limited bandwidth, continuing to deliver IPTV channels to a subscriber who is no longer watching the channel wastes bandwidth that could otherwise be utilized for the same or other subscribers using IPTV, Internet, or telephone services. Accordingly, there is a need for controlling bandwidth for IPTV systems over DSL lines and other communication systems.

SUMMARY OF THE INVENTION

To improve the problem of set top boxes being left turned on and impacting bandwidth of DSL systems, the principles of the present invention provide for using a timer to monitor the length of time that a set top box is set to a channel and, in response to the timer reaching a time limit, requesting a response from a user to verify that the channel is still being watched. If a response is not received within a specified time duration, the signal for the IPTV channel may be disconnected.

One embodiment includes a system for controlling network bandwidth. The system may include a server, such as (i) a "thin client" network middleware server or (ii) a software "thick client" middleware server, adapted to manage video signals being communicated over a network via channels to a network addressed device. Two exemplary configurations may be utilized to produce this behavior, including middleware operating on a network server and software executed by a software client residing within the set top box, which may be downloaded from the server within the network when the customer becomes activated for IPTV service for the first time. In either case, the software/middleware may be configured to manage video signals being communicated to the network addressed device, may be configured to (i) operate a timer to monitor a length of time a channel is being communicated to a network addressed device, (ii) initiate a request to a user of the network addressed device in response to the timer reaching a time limit, and (iii) disconnect the channel from communicating to the network addressed device if a response to the request is not received within a specified time period.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 1 is an illustration of an exemplary communications system between a service provider and subscribers;

DETAILED DESCRIPTION OF THE DRAWINGS

Two exemplary embodiments of the present invention are provided, a "thin client" middleware server and a "thick client" middleware set top box configuration. The "thin client" middleware server configuration is described with respect to FIGS. 2A and 2B and the "thick client" middleware server configuration is described with respect to FIGS. 2C and 2D.

Figure 2A:
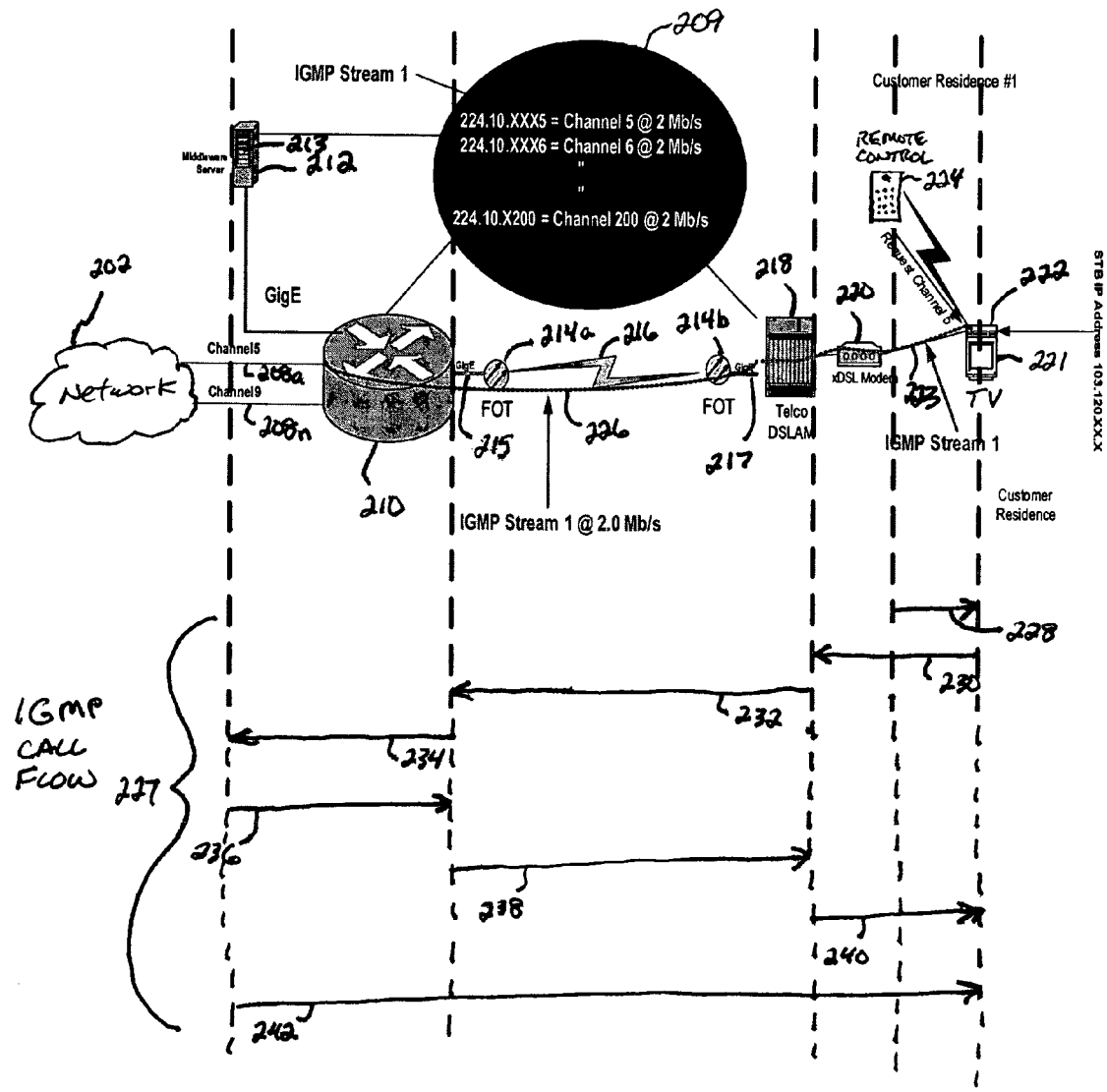
FIG. 2A is an illustration of a communications system for communicating IGMP signals to subscribers and an associated IGMP call flow for controlling communications of IGMP signals for a "thin client" network-based middleware server.

FIG. 2A is an illustration of a communications system 200a for communicating IGMP signals to subscribers and an associated IGMP call flow for controlling communications of IGMP messages (i.e., IPTV signals) for a "thin client" middleware server design. The communications system 200a includes a network 202 from which separate IPTV channel signals 208a-208n (collectively 208) are received. The IPTV channel signals 208 are communicated from a video content source over the network 202 to a router 210. Although only two channels are shown, it should be understood that hundreds or even thousands of channels may be provided by using additional video equipment and communicating the channel signals through the router 210.

A middleware server 212 may be in communication with the router 210 to control IPTV signals being communicated to subscribers. The middleware server 212 may be located at a central office of a telecommunications service provider or elsewhere. The middleware server 212 may be in communication with a number of components on the communications system 200a and execute software 213 for supporting set top boxes at subscriber locations. The middleware server 212 may also support a video on demand server (not shown) and programming selection by a subscriber or user as offered by the telecommunications service provider.

The router 210 provides a multicasting IP address for each video channel, where each video channel is assigned a specific multicasting IP address within the middleware server 212. The router 210 may output each of the channel signals 208 via a gigabit Ethernet (GigE) output line 215 to a fiber optic terminal 214a. The fiber optic terminal 214a communicates with another fiber optic terminal 214b via a communications path or trunking circuit 216. The communications path 216 may be wired, optical, or wireless, and supports the communication of the channel signals 208. The channel signals 208 may be IGMP streams operating at 2 megabits per second, for example. In one embodiment, 200 IGMP streams are communicated via the communications path 216, as represented by channels 5-200 having network addresses 224.10.XXX5-224.10.X200 shown in the channel list 209. The fiber optic terminal 214b may be connected to another gigabit Ethernet line 217 that connects to a digital subscriber line access multiplexer (DSLAM) 220, which is a multiplexer generally located at a central location that links many digital subscriber line connections to a high speed line, such as gigabit Ethernet line 217. The DSLAM 218 is connected to many customer or subscriber locations, such as customer residences, as shown. In one embodiment, the DSLAM 218 is in communication with a DSL modem 220.

A customer having a television 221 or other viewing device, such as a monitor, may also have an associated set top box 222. The set top box 222 may be in communication with the DSL modem 220 receiving an IGMP command signal 223, which may include video content of a particular channel selected by a user using a remote control 224 that interacts with the set top box 222.

The set top box 222 enables a user to select channels through a programming guide, as understood in the art. The programming guide, which may be an enhanced programming guide (EPG), enables a user to select programming channels and video on demand offerings, such as movies. The set top box 222 communicates with the software 213 within the middleware server 212 through the DSL modem 220 and DSLAM 218 or, if the middleware used supports a "thick client" approach (See FIGS. 2C and 2D), the functionality would reside in "thick client" middleware software 225 in the set top box 222. This communication within or between the set top box 222 and middleware server 212 enables the service provider to monitor television usage, including channel selections, video on demand purchases, and other aspects of subscribers' television usage as understood in the art.

A call flow 227 for the communications system 200a in providing IPTV services is shown below the communications system 200a. Vertically oriented dashed lines are representative of the equipment initiating or receiving an IGMP call. At step 228, a user of the set top box 222 who is watching the television 221 may use the remote control 224 to select a channel. For example, the user may use the remote control 224 to select channel 5, which may be designated multicast IP address 224.10.XXX5, from the set top box 222 having IP address 103.120.XX.X. At step 230, the set top box 222 may respond by sending an IGMPv2 "join" request either to the set top box 222 if "thick client" supported or from the set top box 222 to the DSLAM 218 that supports IGMPv2 protocol snooping or proxy functionality to receive the multicast IP address of channel 5 (i.e., multicast IP address 224.10.XXX5). At step 232, the DSLAM may in turn, send the join request to the router 210, which is upstream from the DSLAM 218.

At step 234, the router 210 receives the IGMPv2 join request and sends a request for channel 5 to the middle ware server 212. The middleware server 212 points the router 210 to the multicast IP address 224.10.XXX5 for channel 5 at step 236. At step 238, the router 210 communicates the channel 5 multicast IP address to the DSLAM 218, which, in turn, communicates the multicast IP address via the DSL modem 220 to the set top box 222 at step 240. At step 242, the set top box 222 may access the channel 5 video stream signal 208a from the router 210 for display on the television 221. Whether the path taken in requesting the multicast IP address is the same as that shown and described or otherwise, the middleware server 212 is used to manage the channel selection process via the set top box 222 by a subscriber.

The principles of the present invention may utilize a timer feature provided by the IGMPv2 standard, which is defined by the Internet Group Management Protocol version 2 RFC 2236 by the Internet Engineering Task Force. The standard may be found at http://www.ietf.org/rfc/rfc2236.txt?number=2236, which is incorporated herein in its entirety. The timer feature provides for a timer to monitor channel usage by a user of the set top box 222. It should be understood that if other IPTV standards or protocols are utilized to provide IPTV, features providing the same or similar functionality may be utilized in accordance with the principles of the present invention. In utilizing the timer feature, the middleware server 212 and/or IPTV set top box 222 may include the IGMPv2 timer feature. Communications may occur between the middleware server 212 and IPTV set top box 222 for monitoring channel usage and controlling bandwidth usage in conjunction with the timer feature.

Figure 2B:
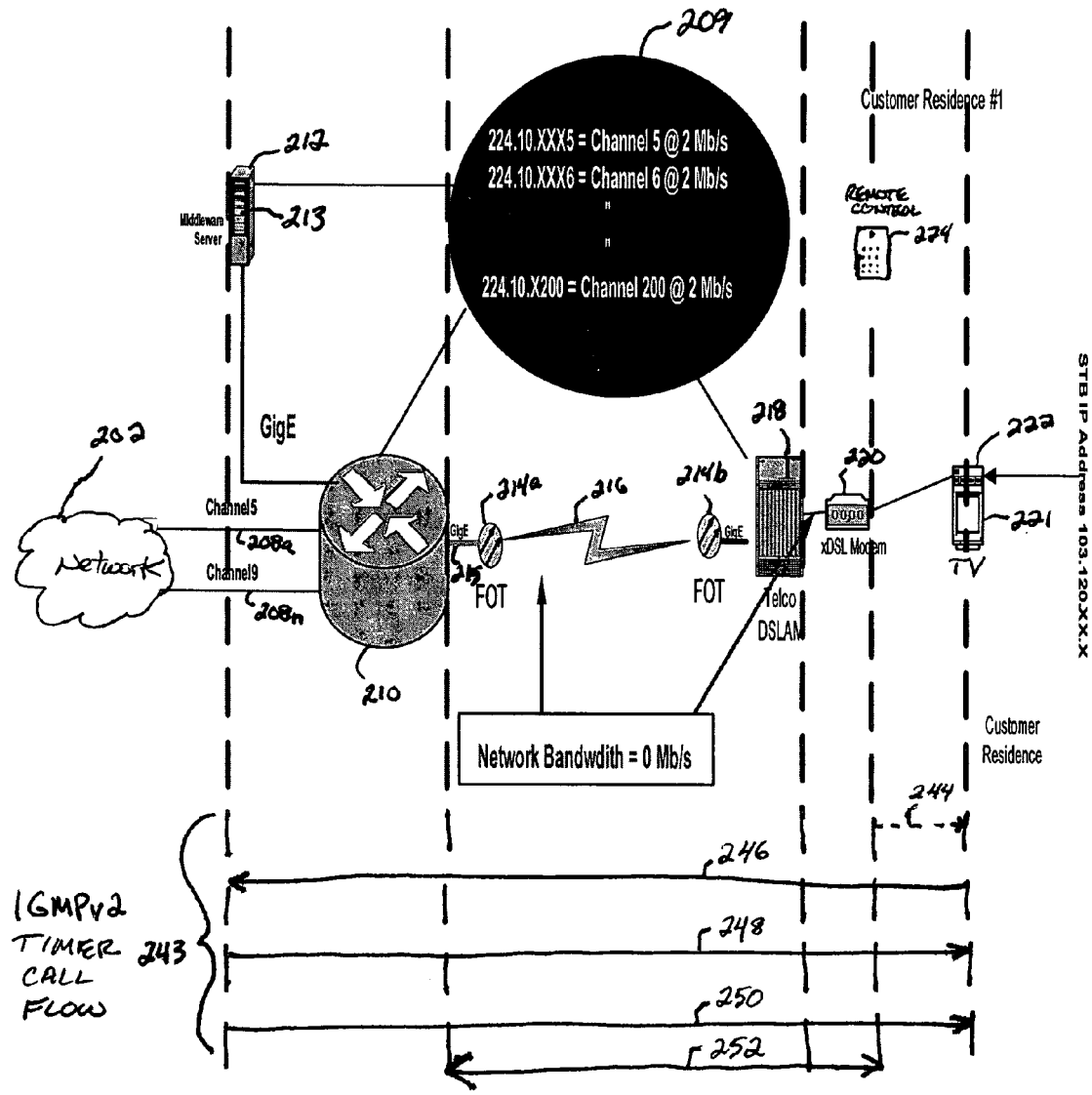
FIG. 2B is an illustration of the communications system of FIG. 2A for communicating the IGMP signals to subscribers and a call flow utilizing IGMPv2 timers.

FIG. 2B is an illustration of the communications system 200a at a later time from that of FIG. 2A when the selection of channel 5 is made. The timer feature of the IGMPv2 standard may be used to monitor the amount of time that a user is watching a particular channel. As understood in the art, and as previously described, there is a bi-directional communication between the IPTV set top box 222 and a "thick client" set top box 222 or "thin client" middleware server 212 to enable the IPTV service provider to monitor a subscriber's usage of the IPTV system set top box 222, including monitoring the channels that the subscriber watches. In monitoring the channels that the subscriber watches, IGMP messages are communicated from the set top box 222 in response to the user selecting a channel using the remote control 224.

In one embodiment, in response to receiving a notice that a channel has been selected at the set top box 222, the "thick client set top box or "thin client" middleware server 212 initiates or starts a timer. The timer is reset each time the user selects a different channel (i.e., changes the channel). The timer may have its duration set by a service provider that operates the middleware server 212. For example, the service provider may set the timer to 6 hours. Alternatively, the timer may be set to 8 hours. It should be understood that the service provider may set the timer to any time duration. In one embodiment, the timer may be set to different durations for different customers. For example, the timer may be set to 6 hours for a household customer and 24 hours for a commercial customer. In one embodiment, the timer feature may be turned off for commercial customers as these customers, such as sports bars, may continuously leave a television tuned to a single channel, such as ESPN.

If the timer feature is used, then the timer, being initiated when the user selects a channel, operates to count up or down. When the timer has reached a certain time duration, which may be set by the service provider, the set top box 222 may be instructed to display a message, such as a banner message or pop-up window, on the television 221. For example, the message may state, "We have noticed that you have been watching the same channel for the past 6 hours. To help us conserve resources, we request that you press the 'Enter' button on your remote control within the next 5 minutes. Otherwise, we will assume that you are no longer watching the television and we will disconnect the current channel you are watching."

In one embodiment, the message may also display a countdown timer to notify the user how much time remains for him or her to cause a human-initiated response by pressing the 'Enter' button on the remote control. The message may be displayed in a similar manner as an Emergency Alert System (EAS), as understood in the art. If the customer does not respond within the specified timeframe, the video stream may be disconnected. It should be understood that if the user has turned off the television, the set top box 222 can attempt to display the message and, since the user will not see the message due to the television being turned off, that there will be no response and the channel is disconnected. Such a disconnection is understood in the art to be a "prune" or "Leave" function as provided by the IGMPv2 standard definition.

In the case of the user turning on the power to his or her IPTV set top box 222, the set top box 222 may be configured to force a channel change so that the timer is initiated. It should be understood that the timer function may operate in either the middleware server 212 or the set top box 222, but that the results of whether a user responds to the message displayed or attempted to be displayed on the television 221 within the specified timeframe (e.g., 5 minutes) is to be communicated to the software being executed by the "thick client" set top box software 225 of the middleware server 212. If it is determined that the user did not respond to the message in the specified timeframe, then the "thick client" set top box software 225 or the "thin client" network middleware server 212 disconnects the video stream signal (e.g., channel 5 video stream signal 208a) from being communicated to the set top box 222 of the consumer. Disconnecting the video stream signal at the router 210 saves bandwidth (e.g., 2 Mb/s) along the communication path 216, in the DSLAM 218, at the DSL modem 220, and set top box 222. This recovered bandwidth enables other high-speed communications (e.g., VoIP and Internet access) at the customer's location to be utilized and allows the bandwidth resources in the communications system 200b to be re-allocated.

Continuing with FIG. 2B, at step 244, a customer watching television connected to IP address 103.120.XX.X may go to bed and leaves the set top box 222 turned on. At step 246, the "thick client" set top box software 225 or the "thin client" middleware timer expires after reaching a certain time duration. The "thick client" set top box software 225 or the "thin client" middleware server 212 communicates a signal or otherwise causes a message to be displayed by the set top box 222 (e.g., "Please press 'Enter' on remote control if you wish to continue watching the video service.") at step 248. At step 250, if the user does not respond within a specified time duration, the "thick client" set top box software 225 or the "thin client" middleware server 212 prunes the joined set top box and forces a "Leave" to the set top box. In response, the "thick client" set top box software 225 or "thin client" middleware server 212 disconnects the channel signal at the router 210. Network bandwidth between the service provider router 210 and the DSLAM 218 is recovered.

Figure 2C:
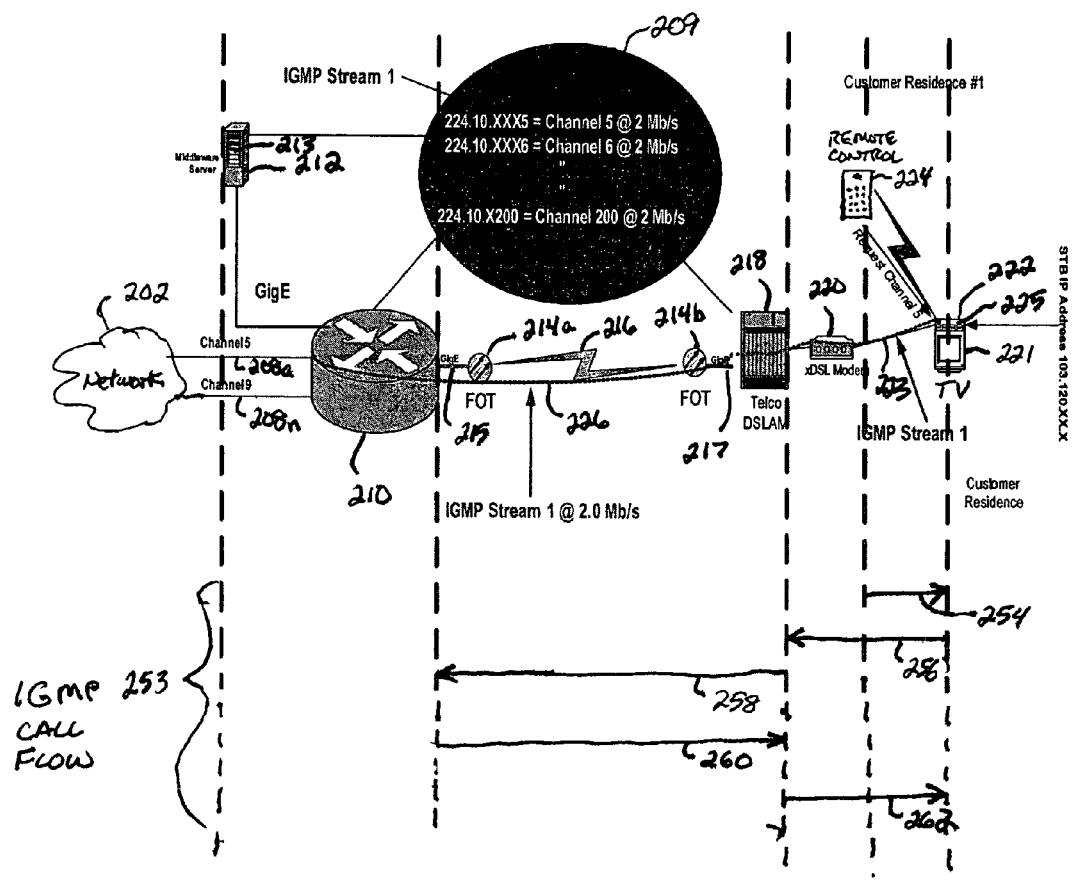
FIG. 2C is an illustration of a communications system for communicating signaling, such as IGMPv2 signaling, to subscribers if the IGMPv2 signaling functionality is supported by using a "thick client" set top box supporting middleware control.

FIG. 2C is an illustration of an exemplary communications system 200b for communicating signals, such as IGMP signals, to subscribers and an associated IGMP call flow 227 for controlling communications of IGMP messages (e.g., IPTV signals) for a "thick client" middleware server design. This design also supports the telco DSLAM 218 that supports IGMPv2 protocol snooping or proxy functionality. The "thick client" middleware design is based on the middleware software vendor and the set top box vendor working together to provide a more efficient type of communications package for the customer. When the customer is brought up for the first time, the set top box 222 requests the middleware client software from the network middleware server 218. The middleware server 218 checks the customer against a database to validate his authorization to access the middleware server 218. When authorized, the middleware server 218 pushes a customer profile image to the customer's set top box "thick client" image. The set top box 222 communicates within the "thick client" middleware software 222 through the DSL modem 220 and DSLAM 218. This communication between the set top box 222 and "thick client" middleware software 213 enables the service provider to monitor television usage, including channel selections, video on demand purchases, and other aspects of subscribers' television usage as understood in the art.

A call flow 253 for the communications system 200b in providing IPTV services is shown below the communications system 200b. Vertically oriented dashed lines are representative of the equipment initiating or receiving an IGMP call. At step 254, a user of the set top box 222 who is watching the television 221 may use the remote control 224 to select a channel. For example, the user may use the remote control 224 to select channel 5, which may be designated IP multicast address 224.10.XXX5, from the set top box 222 having IP address 103.120.XX.X. At step 251, the set top box 222 responds by sending an IGMPv2 "join" request upstream to the DSLAM 218 to request the IP multicast address of channel 5 (i.e., IP multicast address 224.10.XXX5). At step 258, the DSLAM 218 performs a "snoop" from the IGMPv2 join request from the set top box 222 and locates the IP multicasting address. The DSLAM 218 contacts the router 210 for the multicasting IP address. In step 260, the router 210 finds the IP address requested and forwards to the telco DSLAM 218. In step 262, the telco DSLAM 218 receives the requested IP address and sends the request to the appropriate customer set top box for viewing.

The principles of the present invention may utilize a timer feature provided by the IGMPv2 standard. The timer feature provides for a timer to monitor channel usage by a user of the set top box 222. It should be understood that if other IPTV standards or protocols are utilized to provide IPTV, features providing the same or similar functionality may be utilized in accordance with the principles of the present invention. In utilizing the timer feature, the set top box "thick client" middleware software 225 includes the IGMPv2 timer feature and associated communications may occur between for monitoring channel usage and controlling bandwidth usage in conjunction with the timer feature.

Figure 2D:
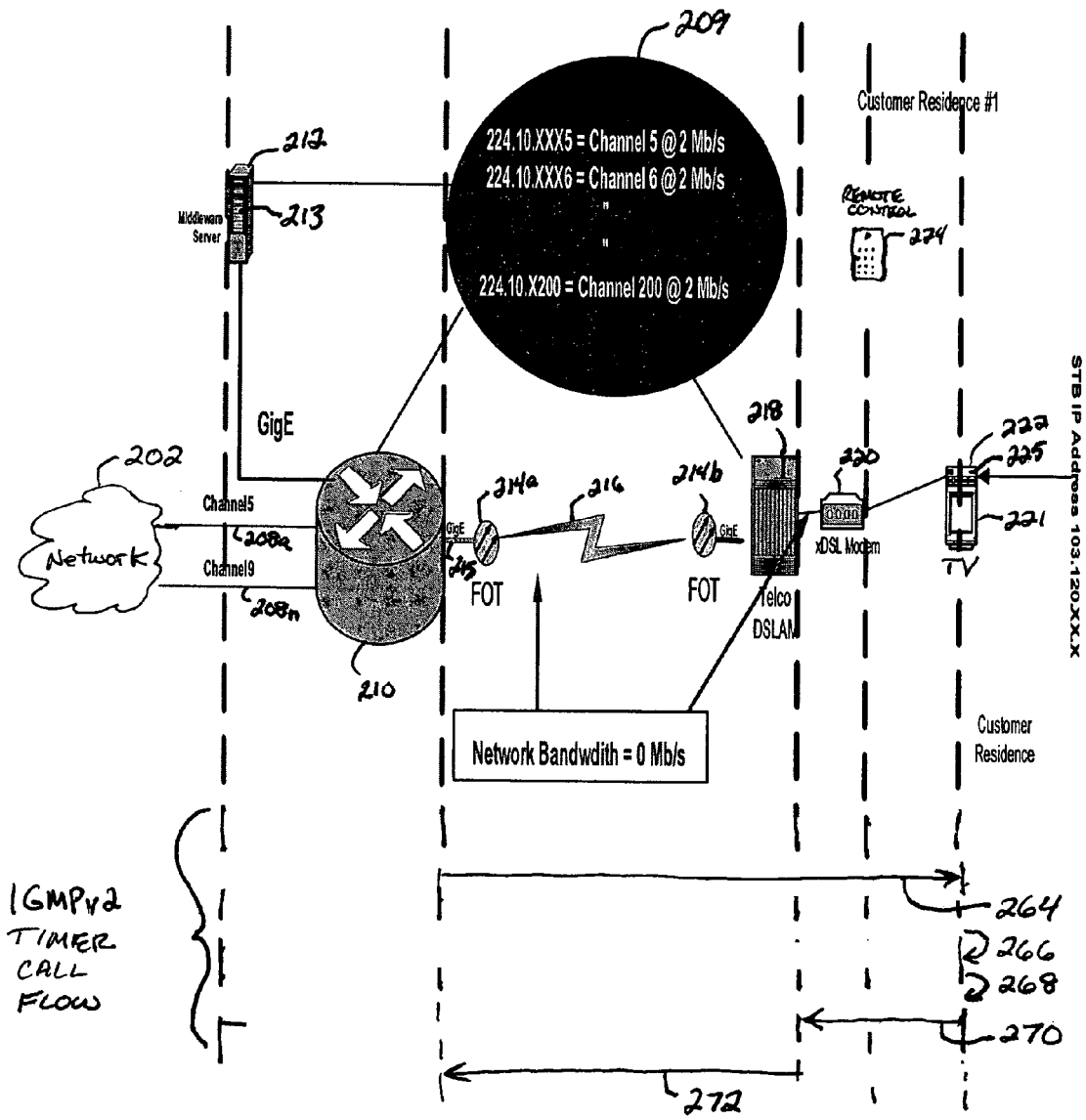
FIG. 2D is an illustration of the communications system of FIG. 2C for communicating signaling to the subscriber and a call flow utilizing timers using a "thick client" middleware supported set top box.

FIG. 2D is an illustration of the communications system 200b at a later time from that of FIG. 2C when the selection of channel 5 is made. The timer feature of the IGMPv2 standard may be used to monitor the amount of time that a user is watching a particular channel. As understood in the art, and as previously described, there is a bi-directional communication between the IPTV set top box 222 and the set top box "thick client' middleware software 225 operating in the set top box 222 to enable the IPTV service provider to monitor a subscriber's usage of the IPTV system set top box 222, including monitoring the channels that the subscriber watches. In monitoring the channels that the subscriber watches, IGMPv2 messages are communicated from the set top box 222 in response to the user selecting a channel using the remote control 224.

In one embodiment, in response to receiving a notice that a channel has been selected at the set top box 222, the "thick client" set top box 222 initiates or starts a timer as optionally operating in the "thick client" middleware software 225. The timer is reset each time the user selects a different the channel (i.e., changes the channel). The timer may have its duration set by a service provider that configures the timer within the middleware. For example, the service provider may set the timer to 6 hours. Alternatively, the timer may be set to 8 hours. It should be understood that the service provider may set the timer to any time duration. In one embodiment, the timer may be set to different durations for different customers. For example, the timer may be set to 6 hours for a household customer and 24 hours for a commercial customer. In one embodiment, the timer feature may be turned off for commercial customers as these customers, such as sports bars, may continuously leave a television tuned to a single channel, such as ESPN.

If the timer feature is used, then the timer, being initiated when the user selects a channel, operates to count up or down. When the timer has reached a certain time duration, which may be set by the service provider, the set top box 222 may operate and display or attempt to display a message, such as a banner message or pop-up window, on the television 221. For example, the message may state, "We have noticed that you have been watching the same channel for the past 6 hours. To help us conserve resources, we request that you press the 'Enter' button on your remote control within the next 5 minutes. Otherwise, we will assume that you are no longer watching the television and we will disconnect the current channel you are watching."

In one embodiment, the message may also display a countdown timer to notify the user how much time remains for him or her to cause a human-initiated response by pressing the 'Enter' button on the remote control. The message may be displayed in a similar manner as an Emergency Alert System (EAS), as understood in the art. If the customer does not respond within the specified timeframe, the video stream may be disconnected. It should be understood that if the user has turned off the television, the set top box 222 can attempt to display the message and, since the user will not see the message due to the television being turned off, that there is no response and the channel is disconnected. Such a disconnection is understood in the art to be a "prune" or "Leave" function as provided by the IGMPv2 standard definition.

In the case of the user turning on the power to his or her IPTV set top box 222, the set top box 222 may be configured to force a channel change so that the timer is initiated. It should be understood that the timer function may operate in "thick client" middleware software 225 within the set top box 222. The results of whether a user responds to the message displayed or attempted to be displayed on the television 221 within the specified timeframe (e.g., 5 minutes) may be determined by the software 225 being executed by the set top box "thick client" software 225. If it is determined that the user did not respond to the message in the specified timeframe, then the set top box "thick client" software 225 disconnects the video stream signal (e.g., channel 5 video stream signal 208a) from being communicated to the set top box 222 of the consumer. Disconnecting the video stream signal at the set top box 222 also disconnects the video service on the customer DSL line and over the communications path or network trunking circuit 216 to save bandwidth (e.g., 2 Mb/s). This recovered bandwidth enables other high-speed communications (e.g., VoIP and Internet access or another video service request) over the customer's DSL access and over the network trunking circuit 216 to be utilized and allows the bandwidth resources in the communications system 200b to be re-allocated.

Continuing with FIG. 2D, at step 264, a customer watching television connected to IP address 103.120.XX.X may go to bed and leave the set top box 222 turned on. At step 266, a set top box "thick client" software timer expires after reaching certain time duration (e.g., 6 hours). At step 268, the set top box "thick client" software communicates a signal or otherwise causes a message to be displayed from the set top box 222 on the television 221 stating (e.g., "Please press 'Enter' on remote control if you wish to continue watching the video service."). At step 270, if the user does not respond within specified time duration, the set top box "thick client" software 225 prunes the IGMPv2 joined message at the set top box 222 and forces a "Leave" message to the telco DSLAM 218. At step 272, the telco DSLAM 218 sends a IGMPv2 "prune" message to the router 210. By doing so, the video stream signal is disconnected, which provides the service provider a bandwidth savings over the network trunk facility 216 and the customer DSL access line for future video or other services requests.

Figure 3:
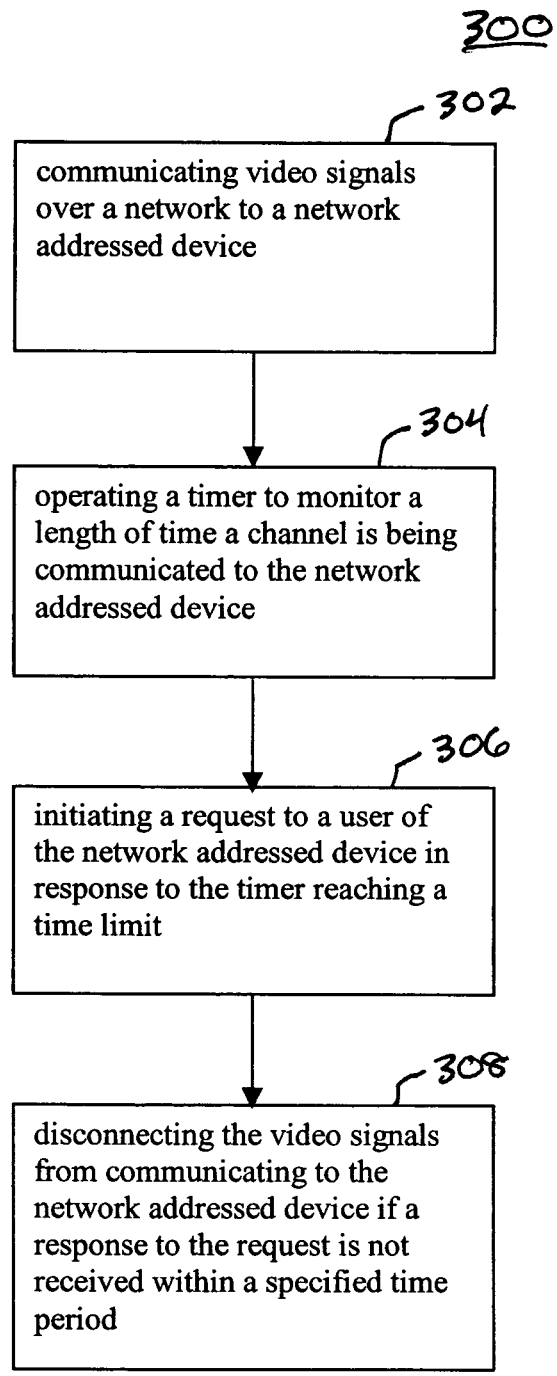
FIG. 3 is a flow diagram of an exemplary process for controlling communications with subscribers to control bandwidth in accordance with the principles of the present invention.

FIG. 3 is a flow diagram of an exemplary process 300 for controlling communications with subscribers to control bandwidth in accordance with the principles of the present invention. The process 300 starts at step 302 where video signals are communicated over a network to a network addressed device. In one embodiment, the video signals are communicated over channels. The video signals may be live programming, recorded programming, cartoons, video on demand, or other programming including images as understood in the art. At step 304, a timer used to monitor a length of time a channel is being communicated to the network device is operated. The timer may be a count up or count down timer. The timer may be one provided by the IGMPv2 standard or higher. At step 306, a request to a user of the network addressed device may be initiated in response to the timer reaching a time limit may be initiated. In terms of reaching a time limit, the time limit may be reached at or after the time limit. For example, if the time limit is set for 6 hours, the time limit may be considered being reached precisely at or slightly after 6 hours.

At step 308, the video signals may be disconnected from communicating to the network addressed device if a response to the request is not received within a specified time period. The specified time period may be set to 5 minutes, for example. Alternatively, other time periods may be specified. The response to the request may be a response from a user. Alternatively, a user may set an override to cause a response to automatically be generated from the network addressed device without human interaction. If a response is received, then the video signals are not disconnected as it is determined that someone is watching the video.

The previous detailed description is of a small number of embodiments for implementing the invention is not intended to be limiting in scope. Once of skill in this art will immediately envisage the methods and variations used to implement this invention in other areas than those described in detail. The following claims set forth a number of the embodiments of the invention disclosed with greater particularity.

What is claimed:

1. A system for controlling network bandwidth, the system comprising:
a server adapted to manage video signals being communicated over a network via channels to a plurality of set-top boxes, including a set-top box, wherein the video signals are internet protocol television (IPTV) signals;
software configured to manage video signals being communicated to the set-top box;
the software, independent of feedback from a device to which the set-top box is in communication, further configured to:
determine whether a timer feature is activated on the set-top box;
in response to determining that the timer feature is activated on the set-top box, operate a timer to monitor a length of time a channel is being communicated to the set-top box, wherein the service provider operating the server sets a time limit for the timer based on a type of customer associated with the set-top box;
in response to determining that the timer feature is activated on the set-top box, causing the set top box to force a channel change when a user turns on the set-top box causing the timer to be initiated;
reset the timer in response to receiving a notice that a different channel has been selected;
initiate a request to a user of the set-top box in response to the timer reaching the time limit; and
disconnect the channel from communicating to the set-top box if a response to the request is not received within a specified time period.

2. The system according to claim 1, wherein said software is executed by said server to operate as a "thin client" middleware on the network server, wherein the server utilizes multicast IP address selections for IPTV channels sent to the plurality of set-top boxes.

3. The system according to claim 1, wherein the software is executed at least in part by the network addressed device to operate as a "thick client" middleware on the network addressed device.

4. The system according to claim 3, wherein the time limit is six to eight hours for residential customers and twenty four hours for commercial customers.

5. The system according to claim 1, wherein the specified time period to receive a response is five (5) minutes or less.

6. The system according to claim 1, wherein the request causes a message to be displayed to a user of the set-top box, the message requesting a user-initiated response, and wherein the specified time period is selected by the user.

7. The system according to claim 6, wherein the message includes a question as to whether the user desires to continue watching the current program.

8. The system according to claim 7, wherein the message is a pop-up window.

9. The system according to claim 8, wherein the channels are IPTV channels.

10. The system according to claim 1, wherein the length of time a channel is being communicated to the set-top box starts substantially from a point in time that said server determines that a particular channel is selected or reselected by the user.

11. The system according to claim 1, wherein the response from the set-top box is a user-initiated response.

12. The system according to claim 1, wherein the timer is an IGMP version 2 or higher feature.

13. The system according to claim 1, wherein the network includes telephone lines or FTTP using IPTV services.

14. The system according to claim 1, wherein the set-top box is adapted to connect to and communicate with a digital subscriber line (DSL) through a DSL modem.

15. The system according to claim 1, wherein the time limit is at least 6 hours.

16. A method for controlling network bandwidth, the method comprising:
communicating video signals over a network to a set-top box, wherein the video signal is an IPTV signal;
determining whether a timer feature is activated on the set-top box;
in response to determining that the timer feature is activated on the set-top box, operating a timer to monitor a length of time a channel is being communicated to the set-top box;

in response to determining that the timer feature is activated on the set-top box, causing the set top box to force a channel change when a user turns on the set-top box causing the timer to be initiated;

resetting the timer in response to receiving a notice that a different channel has been selected;

initiating a request to a user of the set-top box in response to the timer reaching a time limit, wherein the time limit is set by the service provider operating the server based on a type of customer associated with the set-top box; and disconnecting the video signals from communicating to the set-top box if a response to the request is not received within a specified time period.

17. The method according to claim 16, wherein the specified time period to receive a response is five (5) minutes or less.

18. The method according to claim 16, further comprising causing a message to be displayed to a user of the set-top box, the message requesting a user-initiated response, wherein the specified time period is selected by the user.

19. The method according to claim 18, further comprising prompting a question within the message asking whether the user desires to continue watching the current program.

20. The method according to claim 16, wherein communicating content includes communicating video content to the set top box adapted to receive the IPTV signal, and wherein the time limit is six to eight hours for residential customers and twenty four hours for commercial customers.

21. The method according to claim 20, wherein communicating content is performed over different IPTV channels.

22. The method according to claim 16, wherein operating a timer causes the timer to start substantially from a point in time that an IPTV channel is selected to be communicated to the set-top box.

23. The method according to claim 16, wherein monitoring for a response includes monitoring for a user-initiated response.

24. The method according to claim 16, wherein operating the timer is performed using an IGMP version 2 for higher feature.

25. The method according to claim 16, wherein communicating content is performed over a network including telephone lines.

26. The method according to claim 16, wherein communicating video signals is performed using a DSL protocol through a DSL modem in communication with the set-top box.

27. The method according to claim 16, wherein the method operates in a "thin client" middleware configuration utilizing multicast IP address selections for IPTV channels sent to the set-top box.

28. The method according to claim 16, wherein the method operates in a "thick client" middleware configuration.

* * * * *